(No Model.) 2 Sheets—Sheet 1.
G. FLEWWELLING & G. J. HARRIS.
MACHINE FOR SAWING MATCH CARDS.
No. 272,675. Patented Feb. 20, 1883.
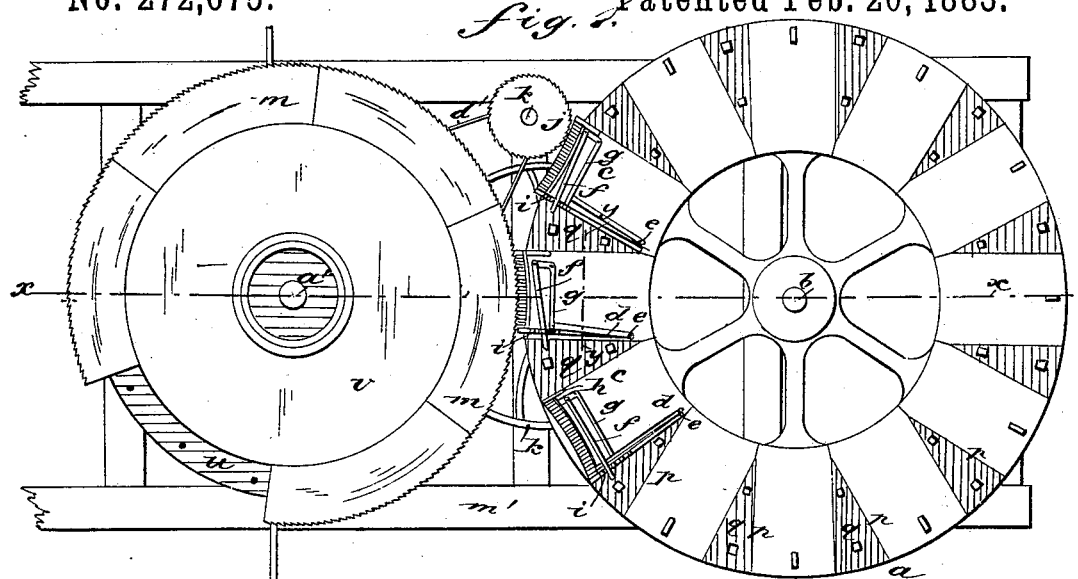
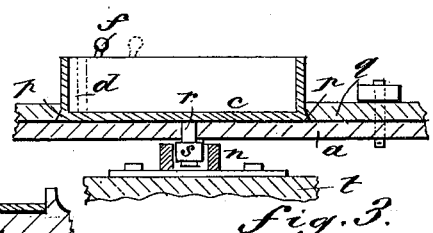
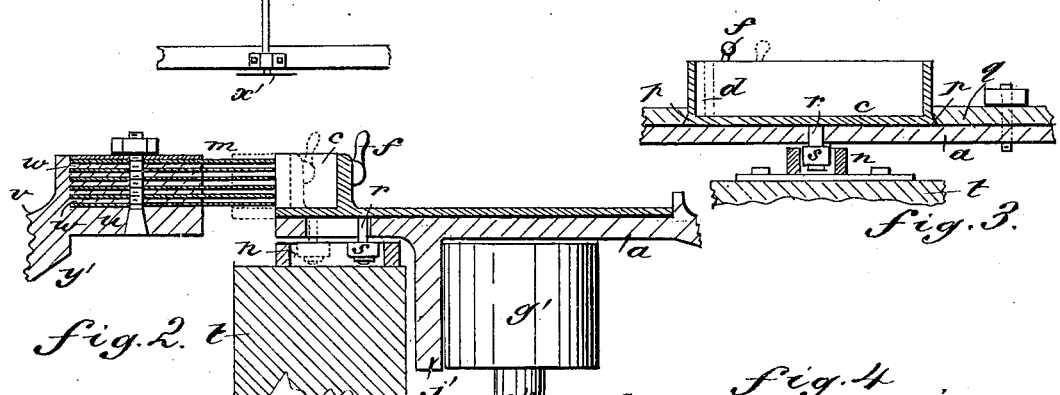
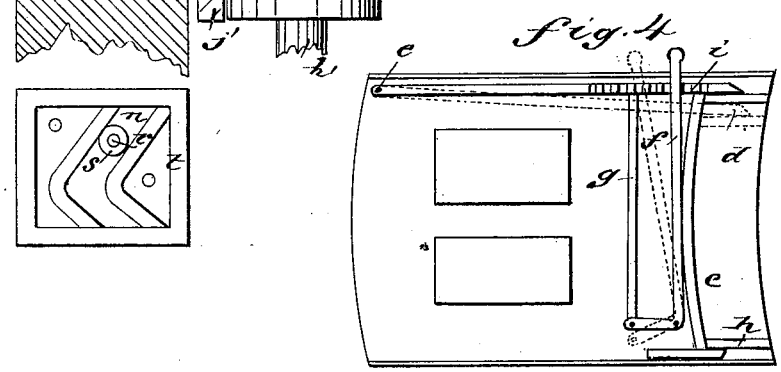
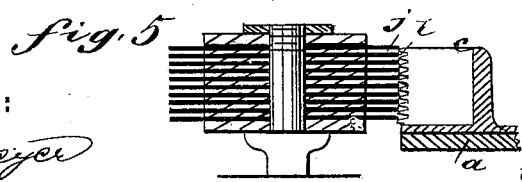
WITNESSES:
INVENTOR:
G. Flewwelling
G. J. Harris
BY Munn & Co.
ATTORNEYS.

(No Model.) 2 Sheets—Sheet 2.
G. FLEWWELLING & G. J. HARRIS.
MACHINE FOR SAWING MATCH CARDS.
No. 272,675. Patented Feb. 20, 1883.
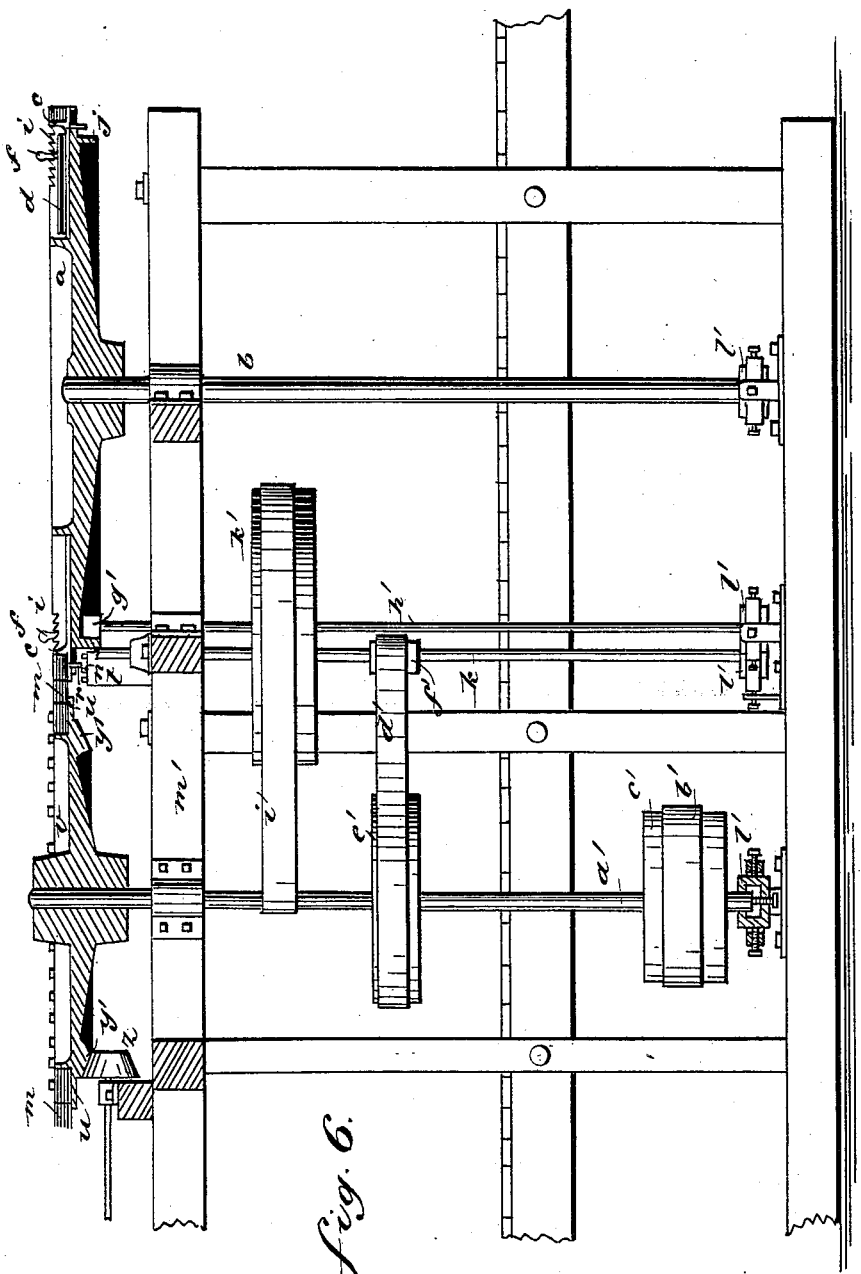
WITNESSES:
INVENTOR:
G. Flewwelling
G. J. Harris
BY
ATTORNEYS.

UNITED STATES PATENT OFFICE.

GILFORD FLEWWELLING AND GILBERT J. HARRIS, OF HAMPTON, NEW BRUNSWICK, CANADA.

MACHINE FOR SAWING MATCH-CARDS.

SPECIFICATION forming part of Letters Patent No. 272,675, dated February 20, 1883.

Application filed August 9, 1882. (No model.)

To all whom it may concern:

Be it known that we, GILFORD FLEWWELLING and GILBERT J. HARRIS, of Hampton, in the county of Kings, Province of New Brunswick, Canada, have invented a new and Improved Machine for Sawing Match-Cards, of which the following is a full, clear, and exact description.

Our invention consists of a disk with a series of holders for the blocks or cards to be sawed, mounted on slides for being moved up to and away from the saws by a cam device located under the disk, a series of grooving-saws, and a series of slitting-saws; also, a cutting-off saw, combined and arranged for making match-cards in a rapid and expeditious manner, and forming the splints with tapered or reduced ends, the object being to produce superior card-matches with the minimum of wood and composition, as hereinafter fully described.

Reference is to be had to the accompanying drawings, forming part of this specification, in which similar letters of reference indicate corresponding parts in all the figures.

Figure 1 is a plan view of our improved machine, with some of the segments of the slitting-saws detached. Fig. 2 is a detailed section of Fig. 1 on the line $x\,x$. Fig. 3 is a detail section of Fig. 1 on line $y\,y$. Fig. 4 is a plan view of one of the holding-slides by which the blocks to be sawed are presented to the saws. Fig. 5 is a section of the series of grooving-saws and part of one of the holders; and Fig. 6 is a sectional elevation of the whole of the machine on line $x\,x$, Fig. 1.

$a$ represents a horizontal disk, mounted on the top of a vertical shaft, $b$, and carrying a series of radially-sliding block-holders, $c$, in which the blocks or cards to be sawed are clamped by the bar $d$, pivoted at $e$, and worked by the elbow-lever $f$ and rod $g$, so as to bind the blocks between said bar and the wall $h$ and hold them therein by the notched bar $i$, which secures the lever $f$ when adjusted. The blocks, being clamped in these holders so as to project beyond them as much as it is desired that they shall be sawed apart, are to be carried by disk $a$ past the gang of grooving-saws, $j$, mounted on the top of shaft $k$, and being sufficiently thick and tapered at the edges to form grooves in the block of the form represented at $l$, Fig. 5, preparatory to being slitted by the saws $m$, and in order to reduce the edges of the cards to which the composition is to be applied so that the edge of each card will be separately charged. The said blocks are then to be thrust outward on said disk A by cam $n$, after passing saws $j$ and before reaching saws $m$, to be slitted the required depth by the latter, after which they are to be removed by an attendant, and others are to be put in the holders while the disk continues in motion. The holders are fitted in dovetail or equivalent radial ways or grooves $p$ for so sliding, and secured by a detachable piece, $q$, bolted on disk $a$, and they have a stud, $r$, carrying an anti-friction roller, $s$, projecting from the under side to run in the cam $n$, which is located under disk $a$ on a support, $t$, suitably placed to advance the blocks to the saws $m$ at the proper time. The cam returns the holders again to the first position for receiving the new blocks and presenting them to the grooving-saws as before.

The saws $m$ are made in segments and attached to the rim $u$ of a large disk, $v$, with thin washers or levers $w$, between them, said washers being of the same thickness as the required thickness of the match-cards.

Together with the grooving and slitting saws we employ a cutting-off saw, $x'$, for separating the cards from the blocks after being grooved and slit, and we prefer to arrange it for being driven by a friction-rim, $y'$, of the disk $v$, and a friction-pinion, $z$, on the arbor of said saw. The power is applied to the shaft $a'$ of the disk $v$ by a main driving-belt, $b'$, and pulley $c'$. The grooving-saws $j$ are driven by the belt $d'$ from a large pulley, $e'$, on shaft $a'$ to a small pulley, $f'$, on shaft $k$, and the carrying-disk $a$ is driven by a friction-roller, $g'$, on the top of shaft $h'$, working against the friction-rim $j'$ of disk $a$, said shaft $h'$ being driven from shaft $a'$ by a belt, $i'$, working directly from said shaft $a'$ onto a large pulley, $k'$, on shaft $h'$. The respective shafts are provided with suitable steps, $l'$, at the lower end, and have bearings below the upper ends in a suitable frame, $m'$, above which the disks and the saws work.

The means for sliding the holders $c$ out and in may be otherwise arranged, if desired, as is well understood, and we do not limit ourselves to the cam, roller, and stud here shown, and the gearing for driving the respective parts may also be changed at will.

Having thus described our invention, we claim as new and desire to secure by Letters Patent—

1. The combination, with the horizontal disk $a$, arranged on shaft $b$ and carrying the block-holders $c$, of the clamp-bar $d$, pivoted at $e$, the mechanism $f\,g$, and the notched bar $i$, whereby the blocks may be held in the holders, as described.

2. The combination, with the disk $a$, provided with the movable block-holders, of the saws mounted on the top of a shaft, $k$, and the segment-saws $m$, attached to the rim of disk $v$, and having washers $w$, whereby the blocks are first grooved and then slitted the required depth, as described.

3. The combination, with the holders, carrying roller-studs $r\,s$, and sliding in disk $a$, of the detachable piece $q$ and the grooved cam $n$, arranged under said disk on a support, $t$, as and for the purpose specified.

GILFORD FLEWWELLING.
GILBERT J. HARRIS.

Witnesses:
G. W. SHERWOOD,
GEO. G. GILBERT.